United States Patent [19]

Abe et al.

[11] Patent Number: 4,571,991
[45] Date of Patent: Feb. 25, 1986

[54] AIR FLOW MEASURING APPARATUS

[75] Inventors: Tomoaki Abe, Oobu; Masumi Kinugawa, Okazaki; Atsushi Suzuki, Oobu, all of Japan

[73] Assignee: Nippondenso Co., Ltd., Kariya, Japan

[21] Appl. No.: 645,393

[22] Filed: Aug. 29, 1984

[30] Foreign Application Priority Data

Sep. 2, 1983 [JP] Japan .................................. 58-161480

[51] Int. Cl.$^4$ .......................................... G01M 15/00
[52] U.S. Cl. ....................................... 73/118; 73/204
[58] Field of Search ................... 73/118, 204; 123/494

[56] References Cited

U.S. PATENT DOCUMENTS

| | | | |
|---|---|---|---|
| 3,975,951 | 8/1976 | Kohama et al. | 73/116 |
| 4,341,114 | 7/1982 | Plapp | 73/118 |
| 4,373,387 | 2/1983 | Nishimura et al. | 73/118 |
| 4,384,484 | 5/1983 | Kohama et al. | 73/204 |
| 4,393,702 | 7/1983 | Kohama et al. | 73/204 |
| 4,399,697 | 8/1983 | Kohama et al. | 73/204 |

FOREIGN PATENT DOCUMENTS 48818 3/1983 Japan ..................................... 73/204

*Primary Examiner*—Jerry W. Myracle
*Attorney, Agent, or Firm*—Cushman, Darby & Cushman

[57] ABSTRACT

An air flow detecting element is located in the air flow to be measured. This air flow detecting element comprises a heater made of resistant material having a positive temperature coefficient and wound around a first heat resistant frame, a first heat sensitive element wound around the first frame together with the heater and made of resistant material having a positive temperature coefficient and receiving heat from the heater, and a second heat sensitive element wound around a second heat resistant frame and made of resistant material having a positive temperature coefficient, and serving to measure the temperature of the air. A bridge circuit comprises a series circuit consisting of the heater and fixed resistances connected in series with each other, and a series circuit consisting of the first and second heat sensitive elements connected in series with each other. Potential differences at the output terminal of this bridge circuit are compared by an OP amplifier. The base of a transistor, with controls the power source current relative to the bridge circuit, is controlled by the OP amplifier. An output voltage signal which corresponds to the value of the current flowing to the heater is detected and supplied as a terminal voltage of the fixed resistance.

7 Claims, 6 Drawing Figures

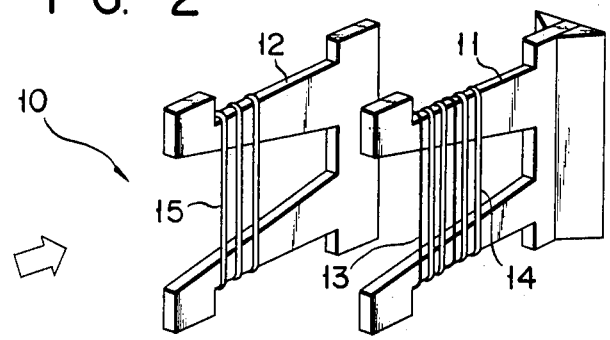
F I G. 2
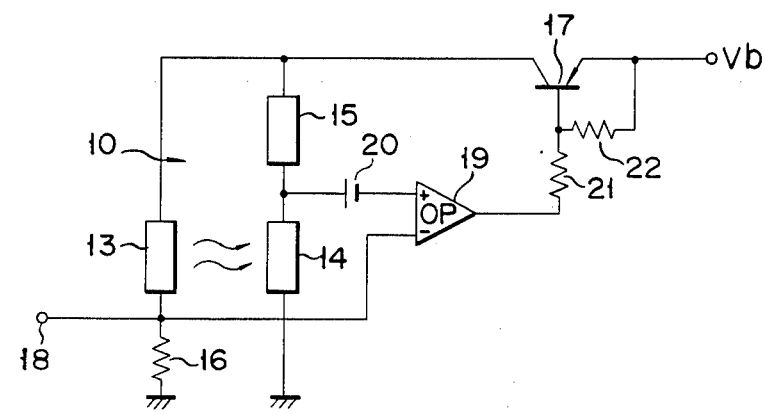
F I G. 3
F I G. 5
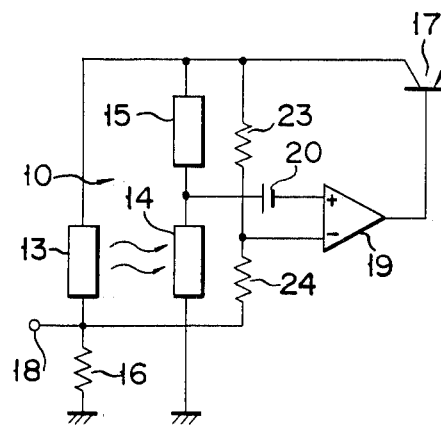
F I G. 6
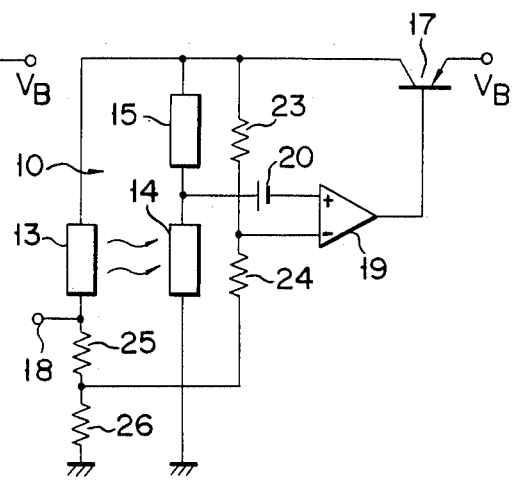

AIR FLOW MEASURING APPARATUS

BACKGROUND OF THE INVENTION

The present invention relates to a gas flow measuring apparatus for measuring and detecting the amount of intake air flowing through the air intake pipe in an internal combustion engine, for example, wherein the output signal of this measuring apparatus is used by the internal combustion engine control unit as one of the signals for detecting the state of operation, said internal combustion engine control unit serving to electronically control the amount fuel injected, the ignition timing, etc., in the internal combustion engine.

The electronic control unit for vehicle engines, for example, measures and detects the amount of intake air as one of the elements of engine performance to determine the state of engine operation. The air flow measuring device is used as a means to measure the amount of intake air. This air flow measuring device is located in the air intake pipe for the engine and heat-wire gas flow measuring device are often used as mass flow meters to detect the electronic measuring signal.

FIG. 1 shows a typical example of the circuit for this air flow measuring apparatus. A bridge circuit 6 includes a heater 2 whose heat is removed by the flow of air, a heat sensitive element 3 for measuring the temperature of the air, and balancing resistances 4 and 5. A power source current controlling transistor 9 is controlled by the output of an OP amplifier 8 in such a way that the potential difference between a connecting point A of the heater 2 and resistance 4 and a connecting point B of the heat sensitive element 3 and resistance 5 is a value which is determined by a constant-voltage source 7. The value of the current flowing to the heater 2 at this time is detected as a potential difference between both ends of the resistance 4, and this detected voltage is picked up as measuring output signal.

In the case where this air flow measuring apparatus is used to electronically control the internal combustion engine, however, dust adheres to the heater 2 because it is left for a long time in the flow of air to be measured. When dust adheres to the heater 2, the heat releasing effect of the heater 2 which is caused by the flow of air changes and the relationship between the amount of air flow and output voltage changes accordingly, thereby making it difficult to obtain an output signal which represents the correct amount of air flow.

When dust adheres to the heater, the heat transmitting characteristic of the heater to the air generally becomes worse. Even in the case where the amount of air which acts on the heater 2 is equal, the heater 2 covered with dust is heated to the same temperature by less current, thereby balancing the bridge circuit 6.

As the dust becomes thicker on the heater 2, the value of the output voltage decreases even when the amount of air flow is maintained. When the amount of air flow is to be increased using this measuring output signal, therefore, a signal which represents an amount of air flow smaller than the actual one will be obtained. When the air flow measuring apparatus whose heater 2 is covered with dust is used as the apparatus for measuring the amount of intake air in the internal combustion engine, therefore, backfiring is caused in winter and the heater 2 in the apparatus thus becomes further covered with dust. The amount of air to be measured becomes still smaller than the actual one and the amount of fuel injected is controlled less than required, thereby causing backfiring again.

Heating the heater 2 to high temperature and burning off the dust, that is, has been considered as a means for solving this problem. Even if the heater is heated to a high temperature, the dust cannot be burned off completely but will sinter and stick still more to the heater. Therefore, this burning off is not an acceptable solution for obtaining a correct measuring output.

Air flow measuring apparatus which are more flexible, particularly, against dust are disclosed by U.S. Pat. Nos. 4,393,702, 4,399,697 and 4,384,484. When these apparatus, however, the temperature of the heater is transmitted to the heat sensitive element and the temperature change of the heater changes the temperature of the heat sensitive element, which comprises the bridge circuit, thereby slowing their response characteristic. When any of these devices is employed in the electronic control unit for vehicle engines, it becomes necessary to add various corrections and carry out an extremely complicated correct operation, and the like, in the course of changing engine operation.

SUMMARY OF THE INVENTION

An object of the present invention is to provide an air flow measuring apparatus wherein a heater is located in the air flow to be measured, so as to obtain an electronic measuring output signal, using the heat releasing effect of the heater due to the air flow, and to correctly measure the amount of intake air in an internal combustion engine, for example, for a long time period.

Another object of the present invention is to provide an air flow measuring device capable of obtaining a correct measuring output, which corresponds to the amount of air flow, even when the heater located in the air flow is covered with dust.

A further object of the present invention is to provide an air flow measuring device capable of sufficiently changing the measuring output signal in correspondence to any change in the amount of air flow to be measured, and supplying the signal to the control unit for internal combustion engines to be effectively used to control the amount of fuel injected, etc.

With the air flow measuring apparatus of the present invention, the bridge circuit comprises a series circuit consisting of a heater and a fixed resistance, said heater being located in air flow to be measured and formed of a resistance having a positive temperature coefficient, and another series circuit consisting of a first heat sensitive element heated by the heater and having a positive temperature coefficient, and a second heat sensitive element whose resistance value is determined, corresponding to the temperature of air to be measured. The heating current applied to the heater is controlled by an output voltage signal applied from the bridge circuit to put the bridge circuit in specified balanced state and to detect a measuring output signal which represents the amount of air flow, corresponding to the value of the current flowing to the heater.

With this air flow measuring apparatus, the amount of heat transmitted from the heater to the first heat sensitive element changes to keep the bridge circuit balanced so as to obtain a measuring output signal, which represents an actual amount of air flow, even when dust adhering to the heater changes its heat releasing effect because the air flow and the value of current flowing to the heater have changed but the amount of actual air flow has remained the same.

In addition, the response characteristic is improved sufficiently because the heater acts directly on the first heat sensitive element, thereby eliminating the need for specific correction in the course of transient engine operation.

BRIEF DESCRIPTION OF THE DRAWINGS

FIG. 2 is a perspective view showing first embodiment of the air flow measuring apparatus according to the present invention as adapted to a detector element means.

FIG. 3 is a circuit diagram showing the air flow measuring apparatus in which the detector element means is incorporated.

FIGS. 5 and 6 are circuit diagrams showing second and third embodiment of the air flow measuring device according to the present invention.

DETAILED DESCRIPTION OF THE EMBODIMENTS

Figure 1:
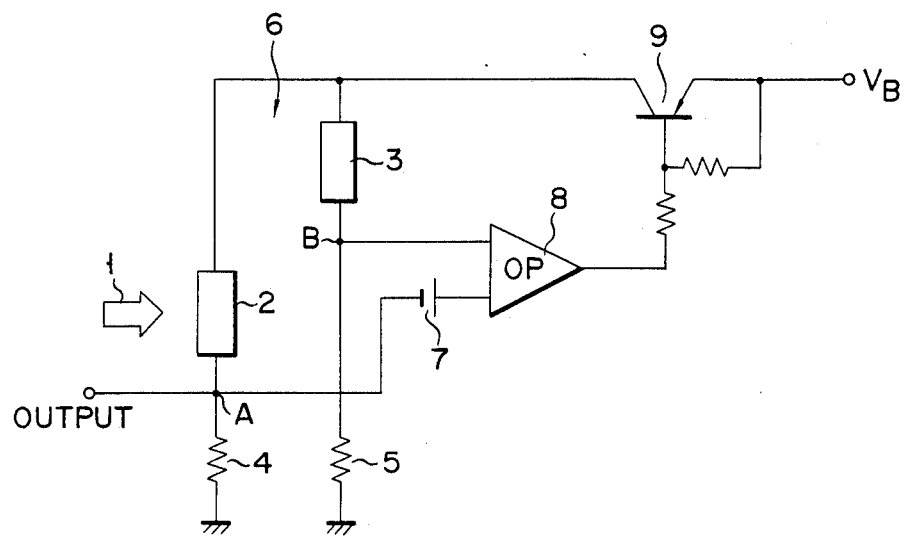
FIG. 1 is a circuit diagram showing a conventional air flow measuring device.

FIG. 2 shows the main portion of a detector element 10 employed by the air flow measuring apparatus, and said detector element 10 includes first and second frames 11 and 12 made of heat resistant material such as ceramic plate, for example. The first and second frames 11 and 12 are made parallel to each other and juxtaposed perpendicular to the air flow direction shown by the arrow.

A heater 13 formed of a resistant wire such as platinum, for example, and having a positive temperature coefficient, is wound around the first frame 11, crossing the air flow. A first heat sensitive element 14 formed of a resistant wire such as platinum and having a positive temperature coefficient, is also similarly wound around the first frame 11. The heater 13 and first heat sensitive element 14 are wound, parallel to each other around the first frame 11 in this case to effectively transmit heat from the heater 13 to the first heat sensitive element 14. A second heat sensitive element 15 formed of a platinum wire similar to the first heat sensitive element and having a positive temperature coefficient, is wound around the second frame 12. The second heat sensitive element 15, which is not influenced by the heater 13, and whose resistant value is determined corresponding to the temperature of air, serves as a thermometer for measuring the temperature of air.

The detector element means 10 becomes operative when the heating current is supplied to the heater 13, and the resistant value of the heat sensitive element 14 wound around the frame 11 is determined by the heat value of the heater 13, mass velocity of air and temperature/resistance characteristic of the heat sensitive element 14 itself. The resistant value of the second heat sensitive element 15 wound around the second frame 12 is not influenced by the heater 13, and is determined by the temperature of the air and the temperature/resistance characteristic of the element 15 itself. Therefore, the output signal which corresponds to the amount of the air flow can be obtained by determining the relationship between the first and second heat sensitive elements 14 and 15 using the bridge circuit.

FIG. 3 is a circuit diagram showing the air flow measuring device wherein the above-described detector element means 10 is employed and the heater 13 is grounded in series through a fixed resistance 16. The first and second heat sensitive elements 14 and 15 are connected in series with each other, and the first heat sensitive element 14 is grounded. A bridge circuit is formed by connecting the heater 13 in a series circuit consisting of the heater 13 and fixed resistance 16 to the second heat sensitive element 15 in a series circuit consisting of the first and second heat sensitive elements 14 and 15.

A series power source Vb is connected to the bridge circuit through a current control circuit which comprises a transistor 17.

A voltage signal, which is determined by the relation between the resistant values of the heater 13 and resistance 16, and which corresponds to the value of current flowing to the heater 13, is detected from the node between the heater 13 and resistance 16, which comprise the bridge circuit. This voltage signal is applied, as a measuring and detecting signal, from an output terminal 18. The voltage signal at this node is applied to the inverted input terminal of an OP (operation) amplifier 19. A voltage signal, which has a predetermined potential difference when compared with the voltage at the node between the first and second heat sensitive elements 14 and 15, is applied to the non-inverted input terminal of this OP amplifier 19 by means of a constant voltage power source 20. The output signal of this OP amplifier 19 is supplied to the base of the transistor 17 via a resistance 21, and a biasing resistance 22 is connected between the emitter and base of this transistor 17.

When the amount of air the flow is increased in the direction shown by the arrow in FIG. 2 in the air flow measuring apparatus having the above arrangement, the temperature of the heater 13 is lowered by the heat releasing effect of the air flow. When the temperature of the heater 13 is lowered like this, its resistant value is also decreased and the voltage relative to the inverted input terminal of the OP amplifier 19 is increased. In addition, the temperature of the first heat sensitive element 14 is lowered following the heater 13, its resistant value is decreased, and the input voltage relative to the non-inverted input terminal of the OP amplifier 19 is decreased. Therefore, the output voltage of the OP amplifier 19 is decreased in this state and current control is carried out to increase the current of the transistor 17 and the amount of heating current supplied to the heater 13.

In short, the heating current to the heater 13 is increased to raise the temperature of the heater 13. When the temperature of the heater 13 is raised, its resistant value is increased and the input voltage relative to the inverted input terminal of the OP amplifier 19 is decreased, thereby balancing the bridge circuit in which this heater 13 is included. In this state, therefore, the value of the heating current supplied to the heater 13 corresponds to the amount of air flow which acts on the heater 13, and output voltage signal of an output terminal 18, which corresponds to the heating current supplied to the heater 13, corresponds to the amount of air flow.

With this air flow measuring apparatus, error caused by dust, which has stuck to the heater 13, can be reduced as follows by locating at one side of the bridge circuit the first heat sensitive element 14 which serves to detect the temperature of the heater 13.

When dust adheres to the heater 13, the temperature of the heater 13 rises even if the same value of heating current is supplied to the heater 13. Even when the value of the heating current is the same in relation to the heater 13, therefore, the resistant value of the heater 13 is increased according to the state of dust stuck to the heater 13. Therefore, the input voltage relative to the inverted input terminal of the OP amplifier 19 is decreased, the temperature at the boundary between the heater 13 and the air flow is lowered and the temperature of the first heat sensitive element 14 is also lowered. Therefore, the input voltage relative to the noninverted input terminal of the OP amplifier 19 is decreased following the decrease of the resistant value of the first heat sensitive element 14.

When dust adheres to the heater 13, the input voltages relative to both input terminals of the OP amplifier 19 change in same direction, so that their influence upon the output of the OP amplifier 19 can be made negligible. Even when dust sticks to the heater 13, therefore, the output of this air flow measuring apparatus virtually uninfluenced, and excellent control of the air/fuel ratio can be achieved, particularly, when this air flow measuring apparatus is incorporated into an internal combustion engine.

Since the heater 13 itself forms the bridge circuit, changes in the temperature or resistant value of the heater 13 relative to the velocity of air flow directly influences the balance of the bridge circuit. Therefore, the measuring output signal can be obtained responding excellently to any change in the amount of air flow.

In the case of the conventional circuit shown in FIG. 1, the potential difference between the output terminals of the bridge circuit is kept certain by means of the constant-voltage power source 7. In the case of the circuit shown in FIG. 3, however, the potential difference between output terminals of the bridge circuit, which is balanced, becomes larger as the output voltage, which is gained corresponding to the fixed resistance 16, becomes large. The increase in potential difference between the output terminals of the bridge circuit means that a larger amount of heating current is supplied to the heater 13 and that the output voltage gained through the output terminal 18 is thus increased. Therefore, a large measuring output can be obtained when the amount of air flow is large.

Figure 4:
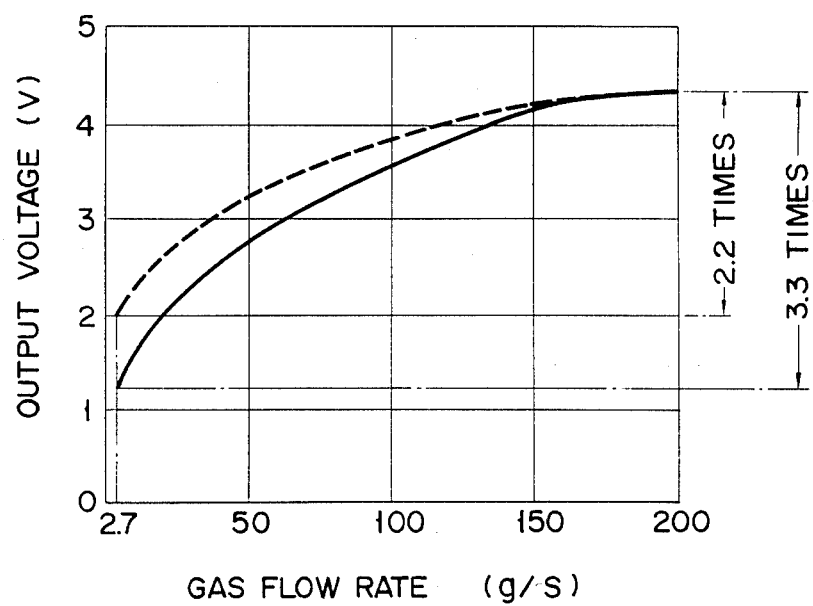
FIG. 4 is a curve diagram showing the relationship of output voltages applied from the conventional and present air flow measuring apparatus in relationship to the amount of air flow.

FIG. 4 shows the relationship between the amount of air flow and the output voltage. As is apparent from the solid line in FIG. 4, a sufficiently larger output voltage can be obtained by the above embodiment of the present invention as compared with that in the conventional one shown by the broken line in FIG. 4. More concretely, the output voltage changed 2.2 times in the conventional air flow measuring device shown in FIG. 1, but 3.3 times in the one shown in FIG. 3 when the amount of air flow changed 75 times.

FIG. 5 shows a second embodiment of the air flow measuring apparatus according to the present invention wherein a voltage signal, which corresponds to current flowing to the heater 13, is divided by resistances 23 and 24 and supplied to the inverted input terminal of the OP amplifier 19. When arranged like this, each constant of the heater 13, fixed resistance 16 and first and second heat sensitive elements 14, 15, which form the fundamental bridge circuit, can be set larger as compared with those of the embodiment shown in FIG. 3.

When a voltage signal generated by the fixed resistance 16 is used directly as the measuring output signal in this case, the absolute value of the output voltage is small. It may become difficult, therefore, for the accuracy and signal/noise ratio to be maintained in the course of subsequent signal treatment.

Considering the process of subsequent signal treatment, FIG. 6 shows a third embodiment of the air flow measuring apparatus according to the present invention, wherein the portion of the fixed resistance 16 is replaced by two resistances 25 and 26 connected in series, and wherein the voltage signal gained through the node between the resistances 26 and 26 is supplied to the OP amplifier 19. When the value of the fixed resistance 16 is set equal to that of the resistance 26 and the value of the resistance 25 is appropriately selected in this case, only the absolute value of the output voltage can be increased without changing the current consumed and the maximum and minimum ratios of output.

What is claimed is:

1. An air flow measuring apparatus comprising:
   a heater made of resistant material having a positive temperature coefficient and located in an air flow to be measured;
   a fixed resistance connected in series to the heater;
   a first heat sensitive element made of resistant material having a positive temperature coefficient, located together with the heater in the air flow, and heated by the heater;
   a second heat sensitive element made of resistant material having a positive temperature coefficient, connected in series to the first heat sensitive element, and located in the air flow to have a resistant value which corresponds to the temperature of the air;
   a current control circuit for supplying a controlled current to a bridge circuit, which comprises a series circuit consisting of the heater and fixed resistance, and a series circuit consisting of the first and second heat sensitive elements;
   a voltage comparing means for comparing voltage at the node between the heater and the fixed resistance, which form the bridge circuit, with the one at the node between the first and the second heat sensitive element to control the current control circuit according to the comparison result thus obtained; and
   an output means for generating a voltage signal which corresponds to the value of the current flowing to the fixed resistance circuit through the heater.

2. An air flow measuring apparatus according to claim 1, wherein the heater and first and second heat sensitive elements are resistant wires each having a positive temperature coefficient, and the heater and first heat sensitive element are juxtaposed and wound around a first frame which is made of heat a resistant insulator, while the second heat sensitive element is wound around a second frame which is also made of a heat resistant insulator.

3. An air flow measuring apparatus according to claim 2, wherein the first and second frames are arranged parallel to each other and perpendicular to the direction of air flow.

4. An air flow measuring apparatus according to claim 1, wherein the current control circuit controls the value of the current supplied to the bridge circuit responsive to the output signal of the voltage comparing means to cause the temperature of the heater to be changed in such a way that the potential difference between the voltage at the node between the heater and the fixed resistance and the voltage at the node between the first and the second heat sensitive element can be specified.

5. An air flow measuring apparatus according to claim 1, wherein a resistance circuit comprising two resistances connected in series with each other is connected to the node between the heater and the fixed resistance, a voltage signal which corresponds to the current flowing to the heater is divided by the two resistances, and the divided voltage signal is used as an input voltage signal relative to the voltage comparing means.

6. An air flow measuring apparatus according to claim 1, wherein the fixed resistance is replaced by two resistances connected in series with each other, and the voltage at the node between these two resistances is used as an input voltage signal relative to the voltage comparing means.

7. An air flow measuring apparatus according to claim 1, wherein the node between the first and the second heat sensitive element, which form the bridge circuit, is connected to the input terminal of the voltage comparing means through a constant-voltage power source.

* * * * *